United States Patent
Saeki et al.

(10) Patent No.: US 10,943,074 B2
(45) Date of Patent: Mar. 9, 2021

(54) TRANSLATION DEVICE AND TRANSLATION METHOD

(71) Applicant: Panasonic Intellectual Property Management Co., Ltd., Osaka (JP)

(72) Inventors: Natsuki Saeki, Osaka (JP); Tomokazu Ishikawa, Osaka (JP); Masakatsu Hoshimi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 121 days.

(21) Appl. No.: 16/257,070

(22) Filed: Jan. 25, 2019

(65) Prior Publication Data

US 2019/0243902 A1    Aug. 8, 2019

Related U.S. Application Data

(63) Continuation of application No. PCT/JP2017/023010, filed on Jun. 22, 2017.

(30) Foreign Application Priority Data

Sep. 9, 2016   (JP) .............................. JP2016-176956

(51) Int. Cl.
*G06F 40/30*   (2020.01)
*G06F 40/58*   (2020.01)
(Continued)

(52) U.S. Cl.
CPC ............ *G06F 40/58* (2020.01); *G06F 40/284* (2020.01); *G06F 40/30* (2020.01); *G06F 40/45* (2020.01); *G06F 40/55* (2020.01); *G10L 15/00* (2013.01)

(58) Field of Classification Search
CPC .......... G06F 40/58; G06F 40/44; G06F 40/45; G06F 40/47
See application file for complete search history.

(56) References Cited

U.S. PATENT DOCUMENTS 6,466,900 B1 * 10/2002 Lissauer ................. G06F 40/55
704/7
6,654,950 B1 * 11/2003 Barnishan ................. G06F 8/20
717/136
(Continued)

FOREIGN PATENT DOCUMENTS

JP     7-141383     6/1995
JP     2008-225744  9/2008
(Continued)

OTHER PUBLICATIONS

International Search Report of PCT application No. PCT/JP2017/023010 dated Sep. 12, 2017.

*Primary Examiner* — Lamont M Spooner
(74) *Attorney, Agent, or Firm* — McDermott Will and Emery LLP

(57) ABSTRACT

A translation device includes an input unit and a controller. The input unit obtains first text data in a first language. The controller generates second text data in a second language that is a translation of the first text data. The controller further generates first replacement data by replacing a first term, of a predetermined type, contained in the first text data by a parameter, obtains second replacement data, in the second language, corresponding to the first replacement data, and generates the second text data by replacing the parameter contained in the second replacement data by a second term in the second language that is a translation of the first term.

13 Claims, 16 Drawing Sheets

(51) Int. Cl.
*G06F 40/44* (2020.01)
*G10L 15/00* (2013.01)
*G06F 40/45* (2020.01)
*G06F 40/55* (2020.01)
*G06F 40/284* (2020.01)

(56) References Cited

U.S. PATENT DOCUMENTS

| | | | | |
|---|---|---|---|---|
| 7,499,850 | B1* | 3/2009 | Neubauer | G06F 40/30 704/9 |
| 8,781,810 | B2* | 7/2014 | Cancedda | G06F 40/56 704/2 |
| 9,244,902 | B2* | 1/2016 | Lui | G06F 40/58 |
| 9,367,541 | B1* | 6/2016 | Servan | G06F 40/295 |
| 9,372,853 | B1* | 6/2016 | Poupko | G06F 40/58 |
| 9,430,463 | B2* | 8/2016 | Futrell | G06F 40/194 |
| 9,442,924 | B2* | 9/2016 | Lui | G06F 40/58 |
| 2002/0035466 | A1* | 3/2002 | Kodama | G06F 40/55 704/4 |
| 2002/0116173 | A1* | 8/2002 | Ratnaparkhi | G06F 40/56 704/9 |
| 2003/0135358 | A1* | 7/2003 | Lissauer | G06F 40/55 704/2 |
| 2006/0025987 | A1* | 2/2006 | Baisley | G06F 40/211 704/4 |
| 2006/0129633 | A1* | 6/2006 | Potluri | G06F 40/12 709/203 |
| 2008/0027830 | A1* | 1/2008 | Johnson | G06Q 30/0625 705/14.68 |
| 2008/0040095 | A1* | 2/2008 | Sinha | G06F 40/45 704/2 |
| 2008/0077391 | A1 | 3/2008 | Chino et al. | |
| 2009/0012776 | A1* | 1/2009 | Chino | G06F 40/45 704/7 |
| 2009/0172539 | A1* | 7/2009 | Bates | G06F 3/011 715/706 |
| 2009/0234800 | A1* | 9/2009 | Antani | G06F 16/2453 |
| 2010/0235162 | A1* | 9/2010 | Faddoul | G06F 40/44 704/6 |
| 2011/0040552 | A1* | 2/2011 | Van Guilder | G06F 40/18 704/4 |
| 2011/0093254 | A1* | 4/2011 | Kuhn | G06F 40/103 704/2 |
| 2011/0264439 | A1 | 10/2011 | Sala et al. | |
| 2011/0288852 | A1* | 11/2011 | Dymetman | G06F 40/45 704/4 |
| 2012/0173223 | A1* | 7/2012 | Liu | G06F 40/45 704/2 |
| 2013/0030787 | A1* | 1/2013 | Cancedda | G06F 40/44 704/2 |
| 2013/0144596 | A1* | 6/2013 | Lui | G06F 40/58 704/2 |
| 2015/0213007 | A1* | 7/2015 | Liu | G06F 40/45 704/2 |
| 2016/0103826 | A1* | 4/2016 | Lui | G06F 40/205 704/3 |
| 2016/0292145 | A1* | 10/2016 | Azzi | G06F 40/211 |
| 2017/0075883 | A1* | 3/2017 | Kamatani | G06F 40/51 |
| 2017/0197152 | A1* | 7/2017 | Bojja | G06F 40/216 |
| 2017/0329788 | A1* | 11/2017 | Grasselt | G06F 16/3344 |

FOREIGN PATENT DOCUMENTS

| | | |
|---|---|---|
| JP | 4393494 B | 1/2010 |
| WO | 2009/107456 | 9/2009 |

* cited by examiner

FIG. 5A

```
Kono hikoki wa panasonikku koku, kansaikuko yuki kyu-sen kyu-hyaku kyu-ju kyu bin desu.
```
D100

この飛行機はパナソニック航空、{%airports!$1%}行き{%flight_num!$1%}便です。

この飛行機はパナソニック航空、{%airports＿＿＿$1%}行き{%flight_num$1%}便です。

| Welcome on board Panasonic flight {%flight_num!$1%} for {%airports!$1%}. | D409 |

| Welcome on board Panasonic flight 9999 for Kansai International Airport. | D500 |

FIG. 6

| TYPE | REGULAR EXPRESSION OF TERM | TRANSLATION | DEGREE OF IMPORTANCE |
|---|---|---|---|
| airports | ((?<!東京)羽田 \| 東京(?:成田)?)(国際)?空港 | Tokyo International Airport | 10 |
| airports | (関西)(国際)?空港 | Kansai International Airport | 5 |
| airports | (大阪 \| 伊丹)(国際)?空港 | Osaka International Airport | 8 |
| flight_num | [0-9]+(?=便) | Func FlightNo(text) | 0 |
| ampm | 午前 | AM | 10 |
| ampm | 午後 | PM | 10 |

→ CALL FUNCTION

FIG. 8

| SCENE NUMBER | JAPANESE | ENGLISH | |
|---|---|---|---|
| 1 | この飛行機は、パナソニック航空{%airports!$1%}行き{%flight_num!$1%}便でございます。 | Welcome on board Panasonic flight {%flight_num!$1%} for {%airports!$1%}. | ⎱ SUBSET 1 (EXAMPLE SENTENCE i) |
| 1 | この飛行機は、パナソニック航空{%airports!$1%}行き{%flight_num!$1%}便でございます。お手荷物は頭上の荷物入れまたは前の座席の下に収納ください。 | Welcome on board Panasonic flight {%flight_num!$1%} for {%airports!$1%}. Please stow your carry-on items in the overhead compartments or under the seat in front of you. | ⎱ SUBSET 2 (EXAMPLE SENTENCE i + ii) |
| 1 | お手荷物は頭上の荷物入れまたは前の座席の下に収納ください。この飛行機には非常口が全部で[ ]ヶ所ございます。 | Please stow your carry-on items in the overhead compartments or under the seat in front of you. There are a total of [ ] exits on this aircraft. | ⎱ SUBSET 3 (EXAMPLE SENTENCE ii + iii) |
| ... | ... | ... | |
| 4 | {%airports!$1%}と{%airports!$2%}の間には、{%hours!$1%}時間の時差があり、ただいまの{%airports!$3%}の時刻は{%ampm!$1%}{%hours!$2%}時です。 | The time difference between {%airports!$1%} and {%airports!$2%} is {%hours!$1%} hours, and the local time in {%airports!$3%} is {%hours!$2%}:00 {%ampm!$1%}. | |
| 4 | この先、座席のリクライニングとテーブルをご使用になれます。お食事がお済みになりましたら、免税品の販売を開始いたします。 | You may now use your seat recline and table. Duty-free sales will start after the meal service has finished. | |

EXAMPLE SENTENCE SET (bracketing rows 1–3)

Konosaki, zasekino rikurainingu shito to teburu wa goshiyo ni naremasu. Mofu o goshiyo ni narareru baai wa, mofu no uekara shitoberuto o oshime kudasai.

⇒ NO TERM DETECTED

↕ SCORE 96
(> 70: THRESHOLD VALUE) — D408a

You may now use your seat recline and table. If you wish to use a blanket, fasten your seat belt over the blanket.

FIG. 12

| EXAMPLE SENTENCE | SCENE | ORDER | JAPANESE | ENGLISH | CHINESE | ... |
|---|---|---|---|---|---|---|
| i | 1 | 1 | この飛行機は、パナソニック航空[ ][行き]便でございます。 | Welcome on board Panasonic flight [ ] for [ ]. | | |
| ii | 1 | 2 | お手荷物は頭上の荷物入れまたは前の座席の下に収納ください。 | Please stow your carry-on items in the overhead compartments or under the seat in front of you. | | |
| iii | 1 | 3 | この飛行機には非常口が全部で[ ]ヶ所ございます。 | There are a total of [ ] exits on this aircraft. | | |
| iv | 1 | 4 | 緊急避難の際にはお手荷物はすべて機内にお残しください。 | In case of an emergency evacuation please leave behind all your carry-on baggage. | | |
| v | 1 | 4 | シートベルトを腰の低い位置でしっかりとお締めください。 | Please fasten your seatbelt tight and low around your hips. | | |

TRANSLATION DEVICE AND TRANSLATION METHOD

TECHNICAL FIELD

The present disclosure relates to a translation device and a translation method that machine-translates data in a first language having been input into data in a second language.

BACKGROUND ART

In general, the machine translation includes translation of free phrases and translation of fixed phrases. In the translation of fixed phrases (hereinafter, referred to as fixed-phrase translation), previously prepared fixed phrases and translation sentences corresponding to the fixed phrases are stored, and a translation sentence is output, depending on the fixed phrase. Therefore, in the fixed-phrase translation, source sentences to be input are limited, but it is easy to obtain highly accurate translations compared with the translation of free phrases. For this reason, the fixed-phrase translation is effective particularly to a case such as an announcement in an aircraft where a speech content is fixed to a certain extent and where translation accuracy is required.

For example, in one fixed-phrase translation, Japanese fixed phrases and English fixed phrases of the translation results of the fixed phrases are previously prepared, a Japanese fixed phrase similar to a phrase having been input is obtained, and an English phrase corresponding to the obtained fixed phrase is output (for example, see PTL 1).

CITATION LIST

Patent Literature

PTL 1: Japanese Patent No. 4393494

SUMMARY

In the conventional fixed-phrase translation, it is difficult to match an input sentence and a fixed phrase. The translation accuracy is therefore not sufficiently high.

The present disclosure provides a translation device that can improve the translation accuracy in the fixed-phrase translation.

A translation device according to an aspect of the present disclosure includes an input unit and a controller. The input unit obtains first text data in a first language. The controller generates second text data in a second language that is a translation of the first text data. The controller further generates first replacement data by replacing a first term, of a predetermined type, contained in the first text data with a parameter, obtains second replacement data, in the second language, corresponding to the first replacement data, and generates the second text data by replacing the parameter contained in the second replacement data with a second term in the second language that is a translation of the first term.

The translation device according to the present disclosure is effective in improving translation accuracy.

BRIEF DESCRIPTION OF DRAWINGS

FIG. 5A is a diagram showing an example of a speech sentence in a first language.
FIG. 5B is a diagram showing a result of recognition of the speech sentence of FIG. 5A by the translation device.
FIG. 5C is a diagram showing a result of when replacement of parameter has been performed on the sentence of FIG. 5B.
FIG. 5D is a diagram showing a result of weighting of parameters performed on the sentence of FIG. 5C.
FIG. 6 is a diagram showing contents of parameter information.
FIG. 8 is a diagram showing contents of example sentence information.
FIG. 10A is a diagram showing an example of a speech sentence in the first language.
FIG. 10B is a diagram showing a result of recognition of the speech sentence of FIG. 10A by the translation device.
FIG. 10C is a diagram showing of a result of a similarity calculation performed on the sentence of FIG. 10B.
FIG. 10D is a diagram showing a translation, of the sentence of FIG. 10C, in the second language.
FIG. 12 is a diagram showing source data for generating example sentence information.

DESCRIPTION OF EMBODIMENTS

Hereinafter, exemplary embodiments will be described in detail with reference to the drawings as appropriate. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors provide the accompanying drawings and the following description to help those skilled in the art to sufficiently understand the present disclosure, but do not intend to use the drawings or the description to limit the subject matters of the claims.

First Exemplary Embodiment

[1-1. Configuration]

Figure 1:
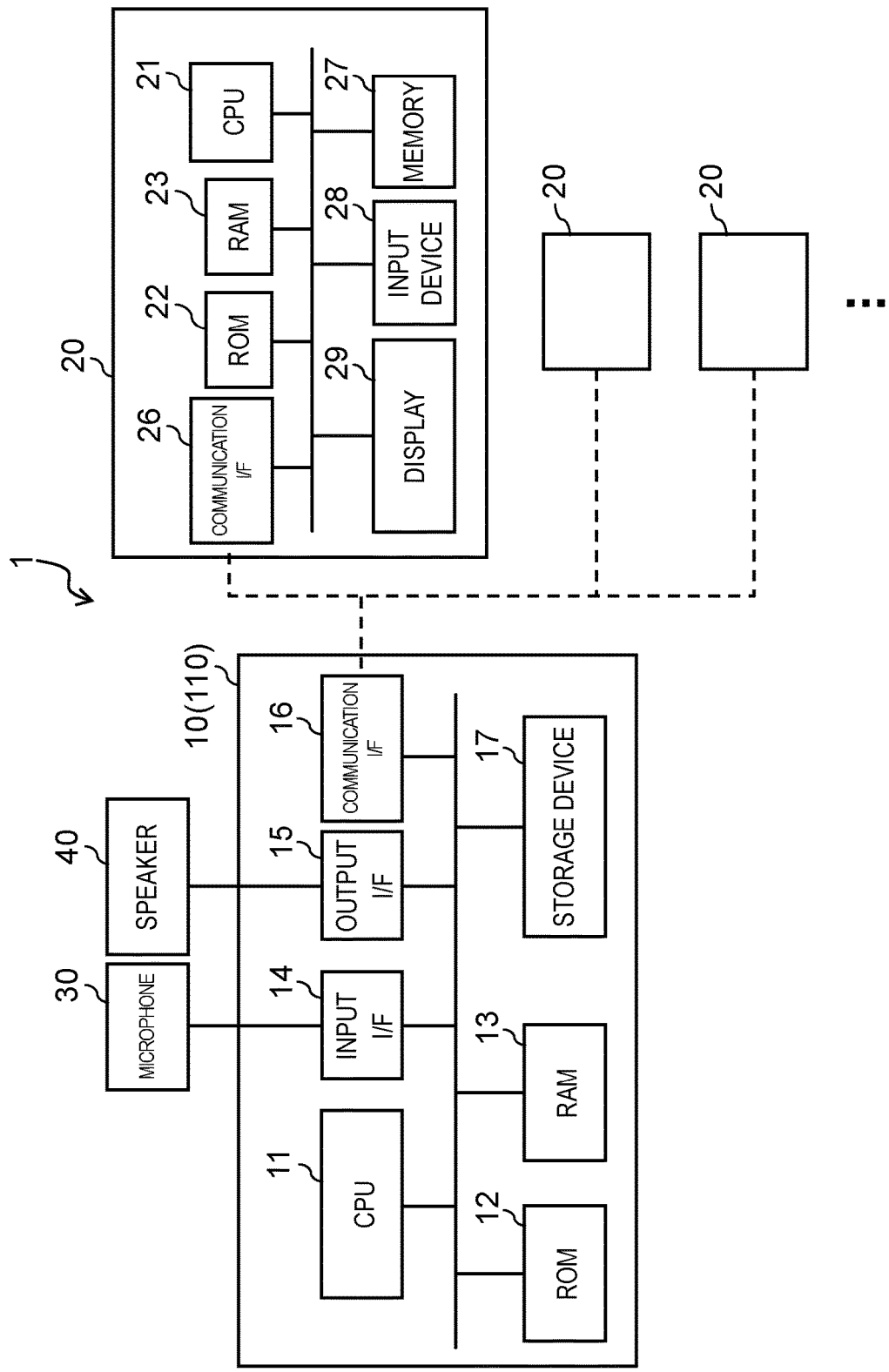
FIG. 1 is an overall configuration diagram of a system according to a first exemplary embodiment.

FIG. 1 shows an overall configuration of system 1 including translation device 110 (see FIG. 2) according to an exemplary embodiment of the present disclosure. In the present exemplary embodiment, system 1 installed in an aircraft will be described as an example. System 1 includes server device 10 (translation device 110) and a plurality of display devices 20 connectable to server device 10 wirelessly or by wire. Each display device 20 is a terminal computer (information terminal) provided on each seat of an aircraft.

[1-1-1. Configuration of Server Device]

Server device 10 is a computer including: central processing unit (CPU) 11 (which is an example of a controller and an input unit), read only memory (ROM) 12, random access memory (RAM) 13, input interface (I/F) 14, output I/F 15, communication I/F 16, and storage device 17.

CPU 11 is a processor or a circuit that performs processing according to a predetermined program. ROM 12 stores a control program and the like in which a processing procedure of CPU 11 is written. RAM 13 temporarily stores as a work memory a control program and data. Input I/F 14 is a connection unit to be connected to microphone 30 and receives A/D converted voice data from microphone 30. Output I/F 15 is a connection unit to be connected to speaker 40 and transmits a D/A converted voice to speaker 40. Communication I/F 16 is a communication circuit for communicating with display devices 20 wirelessly or by wire.

Storage device 17 is a magnetic storage device such as a hard disk drive (HDD) or is a storage device such as a semiconductor memory, and stores programs such as an application and an operating system (OS) and various data. Storage device 17 includes database DB (see FIG. 2) holding various data to be used by CPU 11. Note that storage device 17 may be connected to server device 10 as a storage device separate from server device 10.

Microphone 30 is connected to server device 10 to receive a voice and to output voice data. Microphone 30 is a microphone to be used by a cabin crew, and the voice having been input to the microphone is output from speaker 40.

[1-1-2. Configuration of Translation Device]

Figure 2:
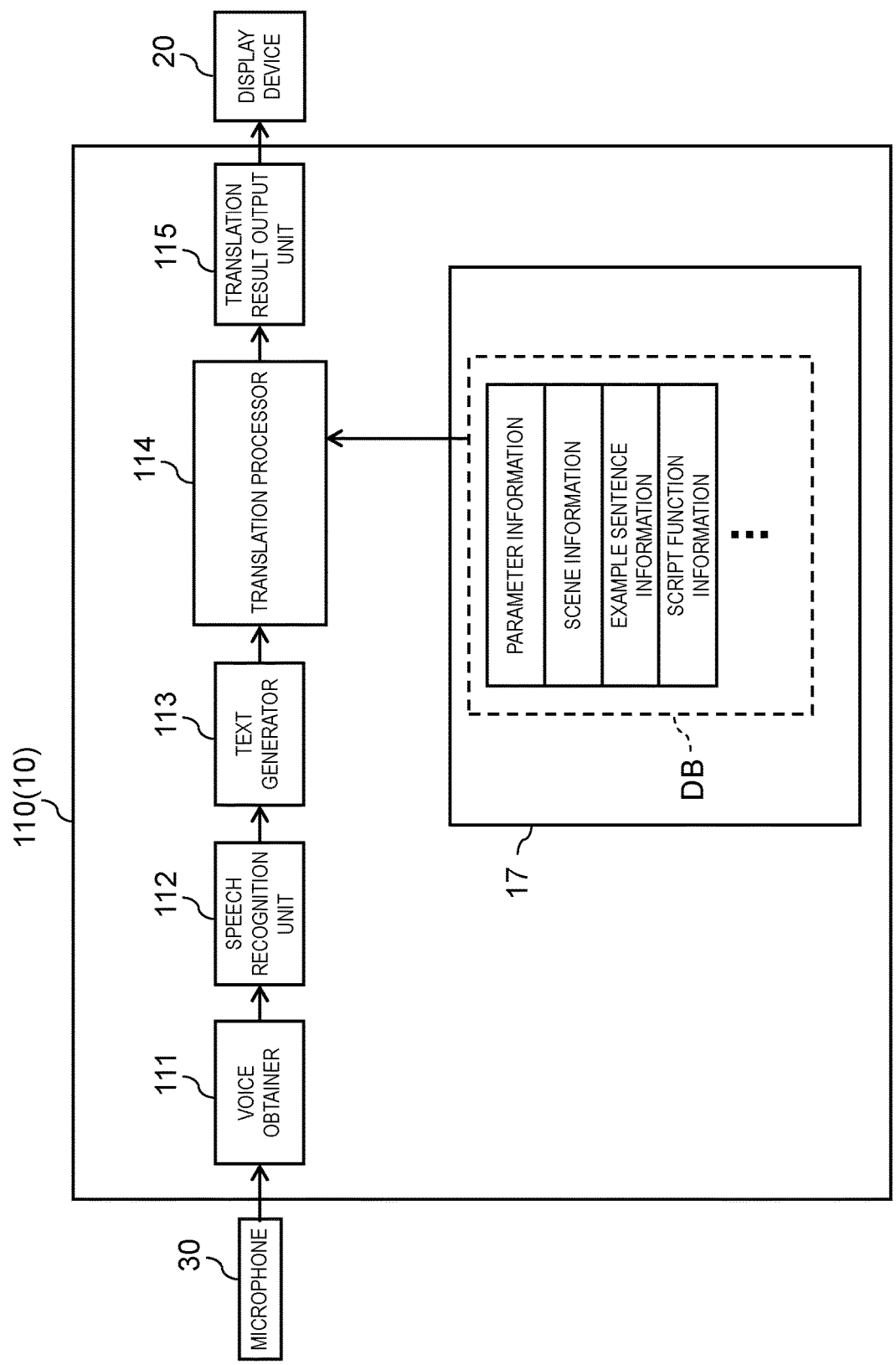
FIG. 2 is a configuration diagram of a translation device according to the first exemplary embodiment.

FIG. 2 shows a configuration of translation device 110 according to the present exemplary embodiment. Translation device 110 is a device that translates data in Japanese (an example of a first language) having been input as a voice into text data in English (an example of a second language).

Translation device 110 includes voice obtainer 111, speech recognition unit 112, text generator 113, translation processor 114, and translation result output unit 115. Each unit of translation device 110 is achieved by CPU 11 executing a predetermined program with reference to data in storage device 17.

Voice obtainer 111 obtains voice data from microphone 30. Speech recognition unit 112 recognizes the obtained voice data based on a previously-stored predetermined model. Text generator 113 converts the recognized voice data into text data. The text data includes character information or a character string that can be converted into a voice or can be displayed on a screen.

Translation processor 114 performs a translation process (to be described later) on the generated text data.

Translation result output unit 115 outputs a result of the translation process by translation processor 114. The output of the translation result is transmitted to each display device 20 via communication IT 16 (connection unit). In this embodiment, the translation result in English is transmitted to each display device 20 that is set to English.

Storage device 17 holds various data stored as database DB.

[1-1-3. Contents of Database]

In database DB, there are stored in association with each other parameter information (see FIG. 6), scene information (see FIG. 11), example sentence information (see FIG. 8), script function information (see FIGS. 9A and 9B), and other information.

<Parameter Information>

As shown in FIG. 6, the parameter information includes a type of a parameter to be described later, a regular expression of a term, a translation, in English, of the term, and a degree of importance of the term. The parameter information is used in a case that text data to be a translation object includes a term of a predetermined type. The predetermined type is a category of important information, for example, an airport name, a flight number of an aircraft, and time. Each predetermined type includes many variations of terms.

As will be described later, the degree of importance is a degree of weighting previously set depending on the type of a parameter and the degree of importance of a term.

Figure 7A:
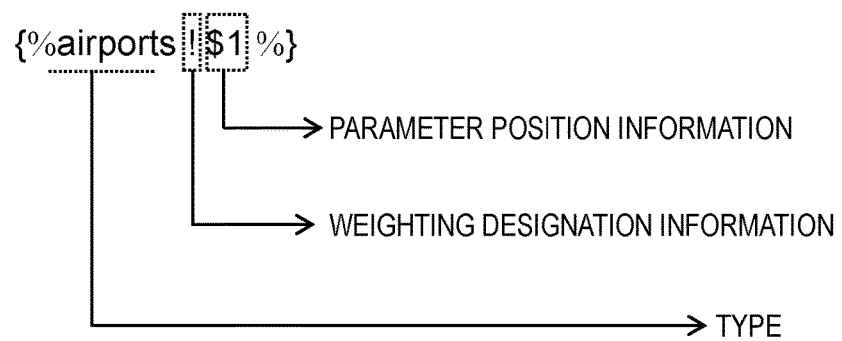
FIGS. 7A and 7B are diagrams each for illustrating a configuration of a parameter.

As shown in FIG. 7A, each parameter includes: weighting designation information (for example, "!") in which the weighting to be set depending on the type (for example, "airports") of the parameter and the degree of importance of the term are reflected; parameter position information (for example, "$1") indicating a position of the parameter in a sentence; "{%" and "%}" indicating a start and an end of the parameter.

Note that, in a case that a plurality of terms of the same type are in the recognized text data, the parameter position information indicates an order of each term in the sentence. For example, in the example shown in FIG. 7B, there are three parameters each representing an airport name, and the text data accordingly contains {% airports!$1%}, {% airports!$2%}, and {% airports!$3%}. In a similar manner, there are two parameters each representing time, and the text data accordingly contains {% hours!$1%} and {% hours!$2%}.

Figure 9A:
FIGS. 9A and 9B are diagrams each showing an example of a script function.
Figure 9B:
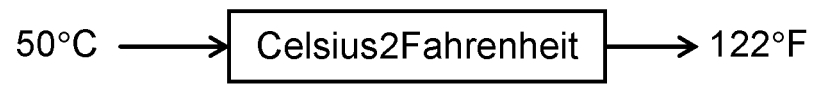

The translations of the parameter information include a call function (script function) as shown in FIG. 6. As shown in FIGS. 9A and 9B, the script function is for converting into an appropriate expression a term that is of a certain type and a pattern of whose content (a number of digits of a numeral, conversion of temperature unit, and the like) is fixed to a certain extent. Quality and accuracy of translation is improved by performing conversion processing by using these functions.

For example, if a flight number is spoken as will be described later, a number of digits of a speech-recognized flight number is sometimes different from an actual number of digits of the flight number. The number of digits of a flight number is previously fixed (four digits in the example of FIG. 9A). Therefore, the script function "FlightNo" previously generated as shown in FIG. 9A is used, so that the flight number can be formed into a flight number having the appropriate number of digits.

Further, as shown in FIG. 9B, it is also possible to use a script function that converts for passengers a unit that is different depending on cultural regions. For example, as shown in FIG. 9B, by using the previously generated script function "Celsius$_2$Fahrenheit", an atmospheric temperature expressed in Celsius (° C.) can be expressed in Fahrenheit (° F.) in the translation result data.

<Scene Information>

Figure 11:
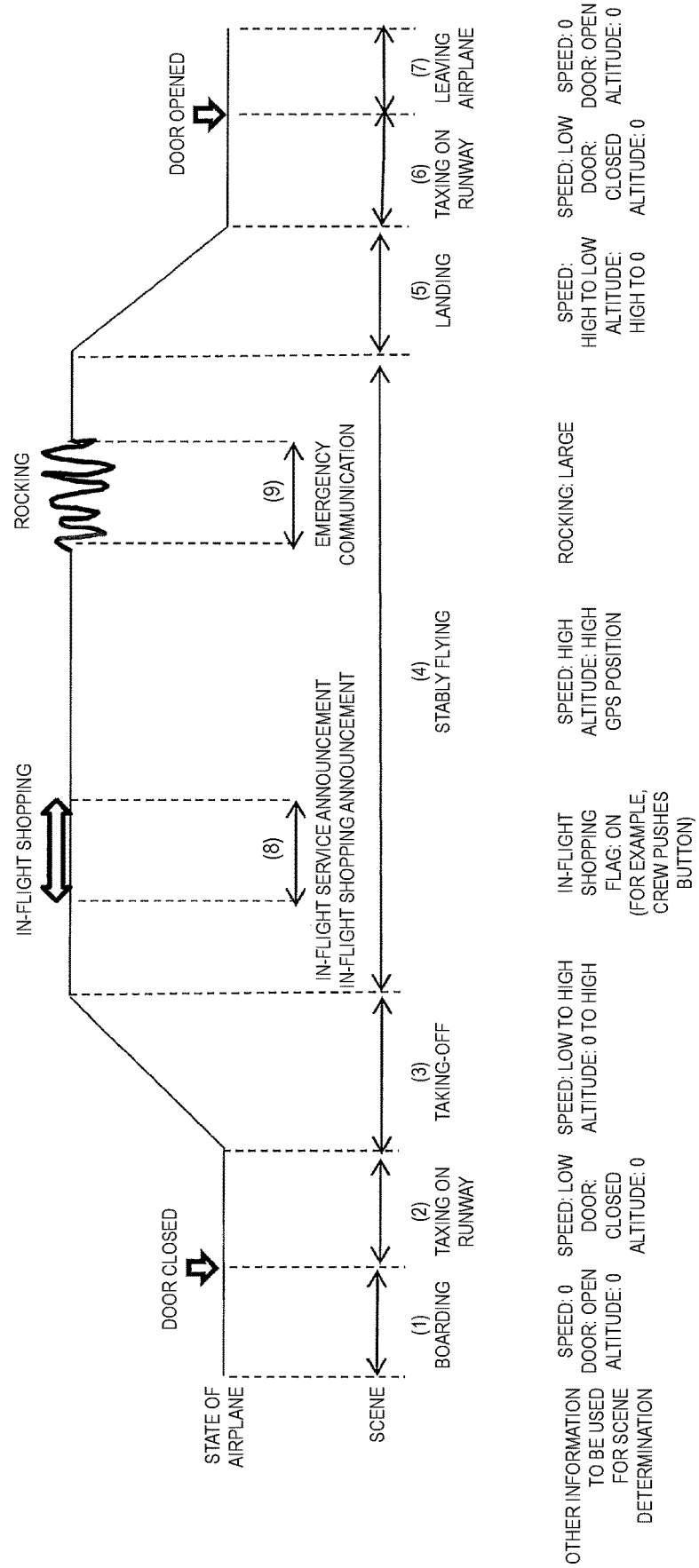
FIG. 11 is a diagram for illustrating scene information and determination of scene.

As shown in FIG. 11, the scene information is information representing time and an environment in which an aircraft is located, and includes information indicating a current scene. Depending on the current scene, a search range of example sentence information to be described later is determined.

<Example Sentence Information>

A shown in FIG. 8, example sentence information (an example of a reference text data group) includes example sentence sets in Japanese and translations corresponding to the example sentence sets. Here, the example sentence sets in Japanese are associated with scene information. Each example sentence set is generated for each scene and is constituted by a combination of a plurality of example sentences (example sentence subsets).

[1-1-4. Configuration of Display Device]

Display device 20 is a computer installed in each seat of an aircraft and including a display for displaying information. Display device 20 includes, as shown in FIG. 1, CPU 21, ROM 22, RAM 23, communication I/F 26, memory 27, input device 28, and display 29.

CPU 21 is a processor or a circuit that processes instructions and data and then outputs the instructions and the data. ROM 22 stores a control program and the like in which a processing procedure of CPU 21 is written. RAM 23 temporarily stores a control program and data, as a work memory. Communication I/F 26 is a communication circuit that can communicate with, for example, server device 10 and other devices in an aircraft by wire or wirelessly. Memory 27 is a storage circuit such as a semiconductor memory and stores data of image and the like.

Input device 28 receives an input operation input via a touch panel, a keyboard, or a pointing device (mouse or the like) by a user in a seat. Display 29 includes a screen that is configured with a liquid crystal panel, an organic electroluminescence (EL) panel, or another panel similar to those panels and that displays a processed image. Display 29 displays text data of a translation result generated by translation device 110.

[1-2. Operation]

Hereinafter, an operation of translation device 110 according to the present disclosure will be described.

[1-2-1. Overall Operation of Translation Device]

Figure 3:
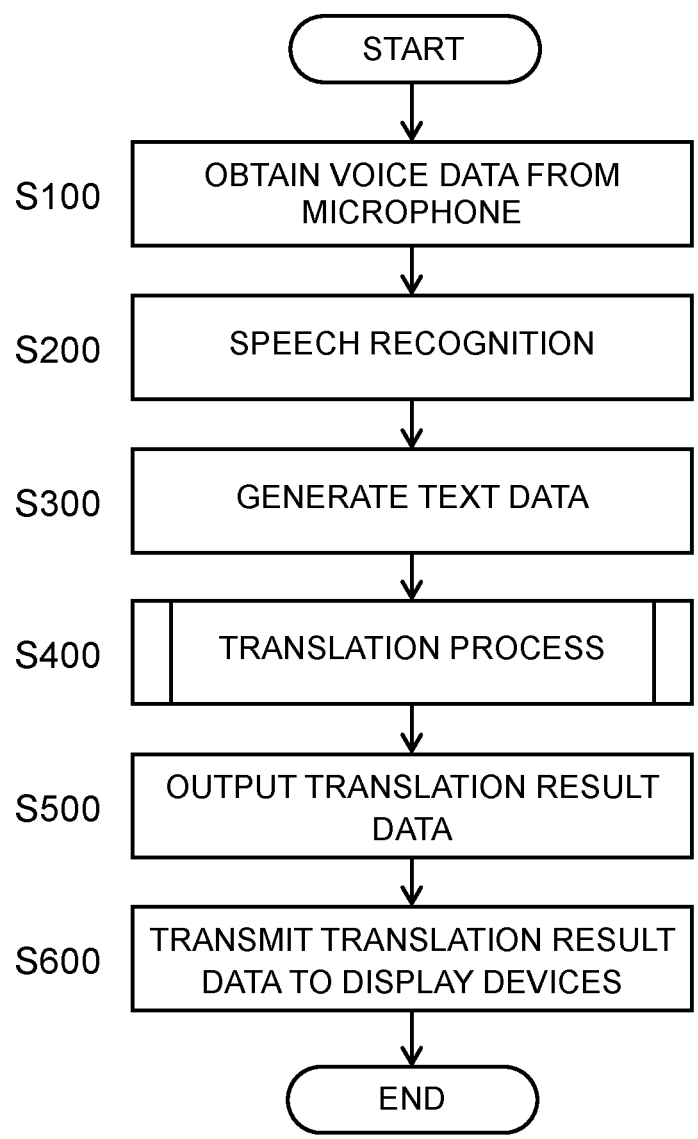
FIG. 3 is a flowchart showing an operation by the translation device.

FIG. 3 shows an overall control flow by translation device 110. Hereinafter, a process will be described in which a content of an announcement in Japanese made by a crew in an aircraft is translated to English.

Step S100: on translation device 110, voice data is obtained from microphone 30 by input I/F 14 and voice obtainer 111. In this description, for example, speech sentence D100 as shown in FIG. 5A is input from microphone 30.

Step S200: the obtained voice data is subjected to a recognition process on speech recognition unit 112. In this description, voice data corresponding to text data D200 shown in FIG. 5B is speech-recognized. Here, the reason why the flight number is recognized to be not "9999" but "9000900909" is that the speech was so slow that the figure at each digit was recognized to be an independent figure.

Step S300: text data D200 (an example of first text data) is generated by text generator 113 from the speech-recognized data, as shown in FIG. 5B.

Step S400: converted text data D200 is subjected to a translation process by translation processor 114 as will be described later.

Step S500: translation result data obtained by the translation process is output from translation result output unit 115.

Figures 5E, 5F, 5G:
FIG. 5E is a diagram showing a result of a similarity calculation performed on the sentence of FIG. 5D.
FIG. 5F is a diagram showing a translation, of the sentence of FIG. 5E, in a second language.
FIG. 5G is a diagram showing a result of replacement of the parameters in the sentence of FIG. 5F.

Step S600: the translation result data is transmitted to display device 20 on each seat, and translation result data D500 (an example of second text data) is displayed on display 29 as shown in FIG. 5G.

[1-2-2. Translation Process]

Figure 4:
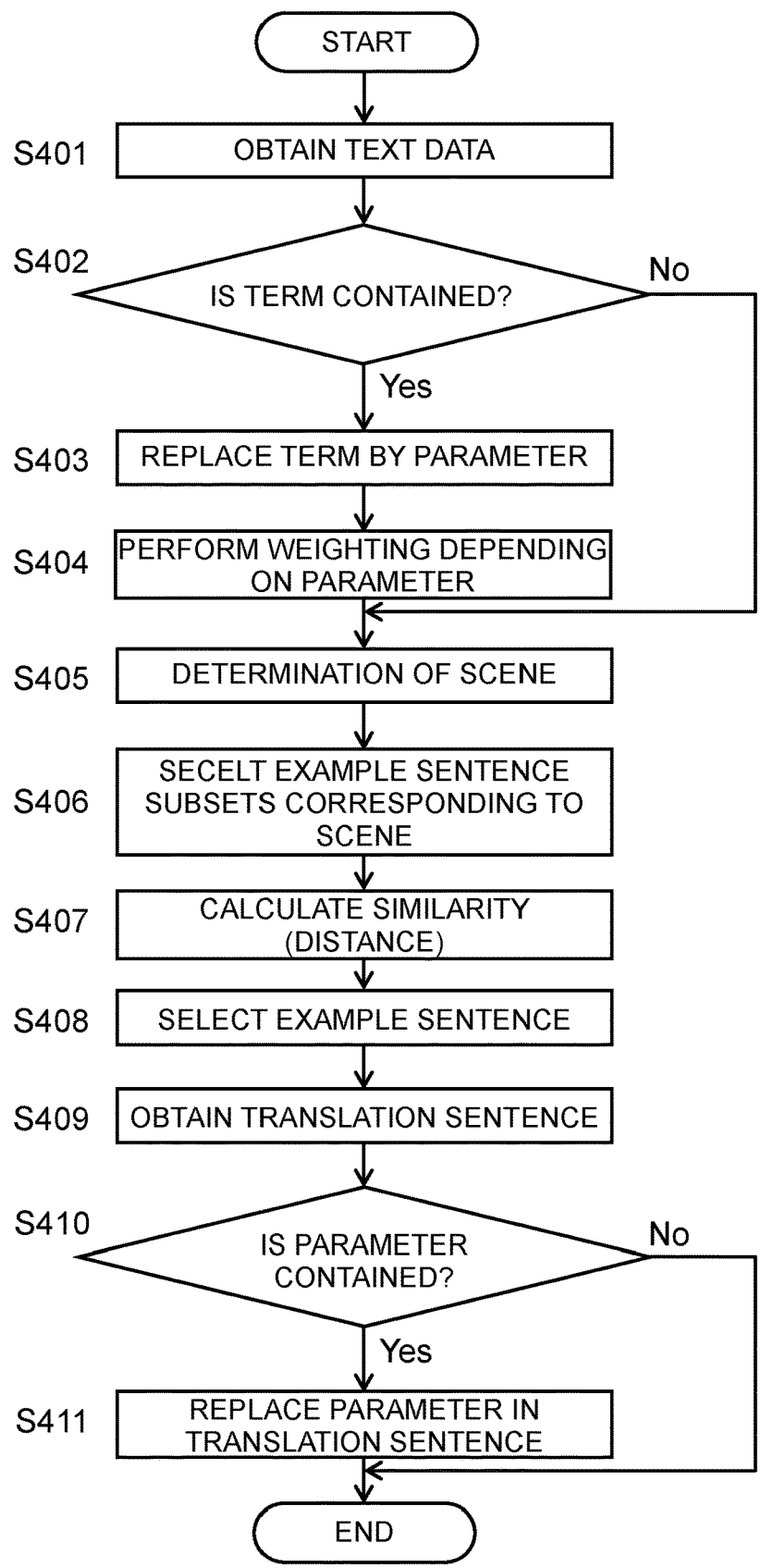
FIG. 4 is a flowchart showing a translation process by the translation device.

FIG. 4 shows a flow of the translation process performed by translation processor 114 (see FIG. 2) in step S400 of FIG. 3.

Step S401: text data D200 generated by text generator 113 in step S300 is obtained.

Step S402: it is determined whether obtained text data D200 includes a term. In the present example, in the case of text data D200 shown in FIG. 5B, by referring to the parameter information shown in FIG. 6, it is determined that term T1 is a term of a type "airports" and that term T2 is a term of a type "flight_num".

Step S403: if recognized text data D200 is determined, in step S402, to include the term, the corresponding term is replaced by a parameter. In the present example, since term T1 and term T2 are each recognized to be a term, data D403 is obtained as shown in FIG. 5C.

Note that the terms recognized before the replacement are stored in association with the parameters in a memory or another device, separately. In this flow, term T1 is put in association with "{% airports!$1%}", and term T2 is put in association with "{% flight_num!$1%}".

Step S404: on the parameters of obtained data D403, weighting is performed depending on weighting designation information (a degree of importance in the parameter information) of the parameter.

Specifically, the degree of importance of term T1 is obtained with reference to the parameter information shown in FIG. 6. Here, the degree of importance of term T1 is "5". Therefore, the weighting designation information "!" in the parameter is replaced by a character string (an example of importance degree information) with a length corresponding to this degree of importance. The longer the length of the character string is, the larger the proportion of the parameter to the whole sentence is. Therefore, accuracy in similarity determination can be increased.

As a result of the above weighting, the length of the character string of the parameter corresponding to term T1 is set in accordance with the degree of importance "5". Note that, in data D404 (an example of first replacement data) of FIG. 5D, the length of the character string is represented by a number of underscores. Specifically, when the degree of importance is 5, the number of underscores is set to 5, which is equal to the degree of importance. Regarding "flight_num", since the degree of importance is 0, the weighting designation information "!" is removed.

Step S405: the current scene is determined based on the scene information. As described above, the scene information is the information representing the environment including time and a state of an aircraft. The current scene changes depending on a predetermined condition or a timing. Details of the scene information and a determination process of the scene information will be described later. Here, an example of the current scene is "boarding" (scene 1) (see FIG. 11).

The scene information is stored in association with the example sentences which are to be searched as described above.

Step S406: for data D404 that contains the parameter and is weighted, an example sentence set corresponding to the current scene is selected. In this example, the example sentence set corresponding to the current scene (scene 1) is assigned as a search object. Specifically, in the example sentence information shown in FIG. 8, the example sentence set (subset 1, subset 2, subset 3, . . . ) corresponding to a scene number "1" is assigned as the search object.

Note that, also in the case where no parameter is determined to be contained in step S402, the current scene is determined (step S405), and the example sentence set is selected corresponding to the determined scene. The process by translation processor 114 on the data containing no parameter will be described later.

Further, a plurality of example sentence sets are the search object for one scene in some cases.

Step S407: similarity (distance) is calculated between each subset of the selected example sentence set and data D404.

In this step, for example, a minimum number of procedures to make identical two character strings for comparison is obtained (the number is also referred to as an edit distance), and the similarity between a pair of character strings between which the minimum number is smaller than any other pairs is determined to be the highest similarity. The procedures are replacement, insertion, deletion, and the like of each character. For example, known methods for determining similarity such as a Levenshtein distance or a Jaro-Winkler distance can be applied.

Although, the degree of importance is set according to the term, but may be set according to the parameter position information. In FIG. 5E, the weighting designation information "!" of the parameter in the example sentence is replaced by the underscores according to the degree of importance of the term.

Further, as shown in FIG. 5E, also in the parameter in example sentence D408, which is to be searched, replacement by underscores and deletion of designation information "!" are performed according to the degree of importance, similarly to the case of data D404.

Step S408: as a result of the similarity calculation in step S407, the example sentence subset whose similarity is the highest and is higher than a predetermined threshold value (score 70) is determined. Here, as the sentence having the highest similarity, example sentence D408 shown in FIG. 5E is selected from example sentence subset 1, subset 2, subset 3, . . . .

Step S409: the translation of example sentence D408 determined in step S408 is obtained. In this description, translation D409 (an example of second replacement data) shown in FIG. 5F is obtained.

Step S410: it is determined whether a parameter is contained in translation D409. Then, if a parameter is contained, the flow advances to step S411. If a parameter is not contained, the flow advances to step S500 of FIG. 3, and the translation is output as a translation result.

Step S411: the parameter in obtained translation D409 is replaced by the translation of the term that is before the replacement and is stored. In this step, the parameter information is referred to so that the translation is determined. For example, in step 403, it is stored that the term, before the replacement, corresponding to {% airports!$1%} is term T1. In addition, the parameter information in FIG. 6 shows that the translation corresponding to term T1 is term t1 "Kansai International Airport". Further, the translation of the parameter "{% flight_num!$1%}", which indicates the flight number, is obtained by using a script function, which is a call function, as shown in the parameter information in FIG. 6. Specifically, by using the script function "FlightNo" shown in FIG. 9A, the number of digits of term T2, which is the recognized data, is formatted; thus, term T2 is converted into "9999".

Figure 7B:
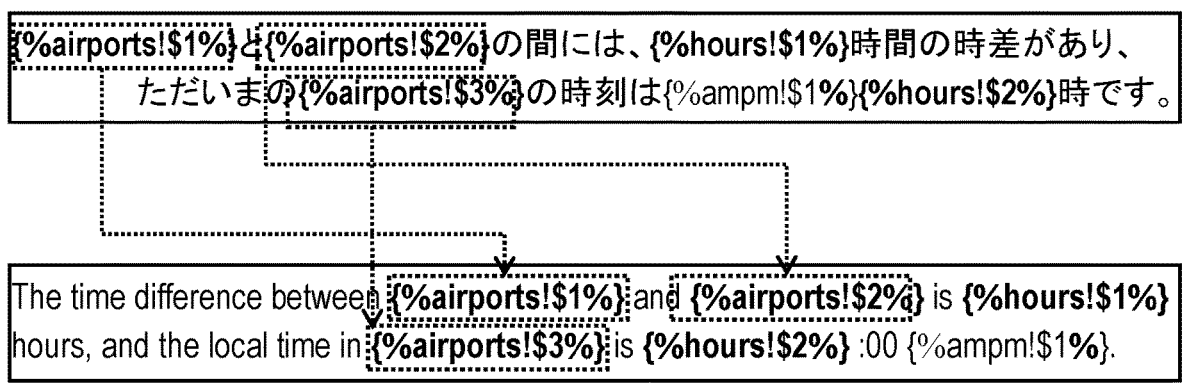

Further, as shown in FIG. 7B, if translation D409 contains a plurality of parameters, English terms may be selected depending on the position parameter information and may replace the parameters.

As a result, translation result data D500 is obtained. Then, the flow advances to step S500 of FIG. 3, and translation result output unit 115 outputs translation result data D500.

[1-2-3. Translation Process when No Parameter is Contained]

A process by translation processor 114 on the data containing no parameter (process from "No" in step S402 of FIG. 4 to steps S405 to S410) will be described by using another example.

In this description, a description will be made by using an example in which speech sentence D100a is input as announcement information from microphone 30 as shown FIG. 10A.

In step S100 of FIG. 3, voice obtainer 111 obtains speech sentence D100a as voice data from microphone 30. Then, in step S200 of FIG. 3, speech sentence D100a is recognized by speech recognition unit 112. Then, in step S300 of FIG. 3, the speech-recognized data is converted into text data D200a as shown in FIG. 10B by text generator 113. Then, the flow shifts to the translation process in step S400.

Similarly to the previous example, translation processor 114 obtains text data D200a (step S401) and determines whether text data D200a contains a term (step S402). In this case, since a term is not contained, the flow shifts to step S405.

Then, similarly to the previous example, the current scene is determined (step S405), and the example sentence set corresponding to the current scene is selected (step S406). Then, as shown in FIG. 10C, similarities are calculated between recognized text data D200a and respective subsets contained in the selected example sentence set (step S407). The calculation of the similarities is the same as in the previous example.

As a result of the similarity calculation in step S407, the example sentence subset whose similarity is the highest and is higher than a predetermined threshold value is selected. Here, as the subset having the highest similarity, subset D408a is selected (step S408). Then, the translation of subset D408a selected in step S408 is obtained (step S409). Here, translation D500a shown in FIG. 10D is obtained. It is determined that the translation does not contain a parameter (step S410), and the flow advances to step S500 of FIG. 3, where the translation is output as a translation result.

[1-2-4. Scene Information and Determination Process]

Hereinafter, with reference to FIG. 11, the scene information and the determination process of the scene information will be described.

<Purpose of Scene Information>

The above-mentioned example sentence information is generated by combining sentences in the existing aircraft manual, as will be described later. However, since a number of combinations of such example sentences (example sentence set) is enormous, only the example sentence set corresponding to each flight scene is generated. When the similarity calculation (search) is actually performed, a possible example sentence set, which corresponds to the "current flight scene" at the time when the announcement is made, is assigned as the search object. With this measure, it is possible to reduce a number of example sentence sets that can be a target of a speech sentence.

As shown in FIG. 11, the scene information is set along a time series of actual operations of a passenger airplane, for example, (1) boarding, (2) taxing on runway (before take-off), (3) taking-off, (4) stably flying, (5) landing, (6) taxing on runway (after landing), (7) leaving the airplane, and the like. In addition, the scene information includes information such as (8) in-flight service announcement, in-flight shopping announcement, or the like, in which announcement timing is specified to a certain extent but the order of the announcements is not specified. The scene information further includes unpredictable announcement information such as (9) emergency communication at the time when an airplane rocks or in other situations.

<Selection of Example Sentence Set as Search Object Corresponding to Determination of Scene>

The example sentence set as a search object is selected depending on determination of scene as follows. Depending on the determination of scene, (a) an example sentence set that is possibly to be used is added as a search object, (b) an example sentence set that is not possible to be used is removed as a search object, or (c) an example sentence set is added or removed as a search object by using as a condition information about the environment including a state of an aircraft.

<Example of Determination of Scene and Switching of Example Sentence Subsets as Search Object>

As described above, depending on the determined current scene, a range of the example sentence set as the search object is extracted. In this case, the scene is determined according to the following rules, and the example sentence subsets of the search object are then switched.

(i) Rule 1

Regarding the scene changing along a time series, translation processor 114 determines the scene according to the following rule. The scene shifts in order as follows, for example, boarding>taxing on runway>taking-off>stably flying>landing>taxing on runway>leaving the airplane, as shown in FIG. 11.

When a crew starts to work, an example sentence set as the search object is the example sentence set corresponding to the current scene "boarding". Therefore, the first search is performed on each subset of this example sentence set. For example, when the scene "boarding" is supposed to be scene 1, the set of example sentences is assigned as the search object corresponding to scene 1 as shown in FIG. 11. When the search has been successful and the corresponding example subset has been obtained from the example sentence set for "boarding", the "current scene" can be determined to be "boarding". Thus, it is stored that the "current scene" is "boarding". Simultaneously with the above operation, (a) "taxing on runway", which is possible to be spoken next, is made to be included in the search object. While speech and search of example sentence are being repeated, if it is determined that the "current scene" changes from the "boarding" to the "taxing on runway", (b) there is no possibility that the example sentence set corresponding to the "boarding" is spoken in the flight of the passenger airplane after that. Therefore, the example sentence set corresponding to the "boarding" is removed from the search object.

In this way, by adding the example sentence set that is possible to be the scene next to the "current scene" and that is determined from the rule describing a scene shift and from a speech content, and by removing the example sentence set having no possibility of being spoken, the search object is limited. With this measure, the example sentence set can be searched with more accuracy and at a higher speed.

Further, if there are a plurality of example sentence sets that can be spoken in one scene, the example sentence sets are assigned as the search object. For example, as shown in FIG. 11, when the current scene is determined to be the "stably flying", the subsequent example sentence sets "in-flight service announcement" and "in-flight shopping announcement" can be spoken. Therefore, the both example sentence sets are made to be included in the search object.

Note that the condition under which or the timing at which the scene is switched (that is, the condition under which or the timing at which the example sentence set as the search object is switched) is not limited to the above determination of scene, and the timing when a state of the flight of the aircraft operation or a state of inside of an airplane changes may be used as the condition. For example, the information of the state, for example, whether an aircraft is running can be obtained from the aircraft. In addition, it is possible to obtain the information about the change in the state by using an altitude, an inclination of the airplane's body, a speed, a direction of the airplane's nose, lighting of a seat belt wearing sign, and the like. For example, as shown in FIG. 11, the scene information has a correspondence relationship between each scene and the state of inside of the airplane. Therefore, the scene may be determined by using the information of a speed, an altitude, whether the door is open or closed, rocking, GPS, and the like. For example, when the information indicating that a large vibration has occurred on the airplane body is obtained, the example sentence set of the "emergency communication" may be automatically assigned as the search object by switching the current scene to scene (9) regardless of the current scene.

Further, direct input by a crew to server device 10 may switch the current scene.

(ii) Rule 2

A scene occurring simultaneously with another scene is determined as described below. For example, the example sentence set corresponding to the in-flight service announcement of scene (8) is set to be the search object only at a time of stably flying. Further, the example sentence set corresponding to the emergency communication of scene (9) is constantly set to be the search object regardless of the switching of the scene.

The range in which the example sentence information is referred to may be changed depending on the scene as described above.

[1-2-5. Generation of Source Data for Example Sentence Set]

The example sentence sets are generated from source data generated from a manual of announcement information of an aviation company and other material. Specifically, the example sentence subsets constituting each example sentence set (see FIG. 8) are generated by connecting sentences in the same scene to generate combined sentences. Each example sentence subset is generated by using a maximum combination number of sentences as an upper limit. For example, the maximum combination number is 4.

FIG. 12 shows examples of source data for generating example sentence subsets. FIG. 12 shows example sentences i to v to be used in scene 1 (boarding). "Order" shown in each example sentence indicates the order in which each example sentence is combined. Based on example sentences i to v, a plurality of example sentence subsets (for example, see FIG. 8) corresponding to all combinations, such as i, i+ii, ii+iii, . . . , are generated, and the generated example sentence subsets are stored as the example sentence set corresponding to the scene.

The example sentence subsets are generated in the order (ascending order). A combination such as order from 4 to 3 is not generated. For example, the combination of example sentence i+example sentence ii is generated as a proper example sentence subset, because the order of example sentence i is 1 and the order of example sentence ii is 2. However, the combination of example sentence v+example sentence iii is not proper and is not generated, because the order of example sentence v is 4 and the order of example sentence iii is 3.

Further, because the order of example sentence iv and the order of example sentence v are both 4, any one of the two may come before the other. In addition, an example sentence set containing the same order such as example sentence iv+example sentence v may be generated. Alternatively, to the contrary, in the case where some example sentences have the same order, an exclusive flag or the like may be set so that an example sentence subset containing any one of the example sentences can be allowed to be generated.

[1-3. Effect and Other Benefits]

In translation device 110 according to the exemplary embodiment, translation processor 114 replaces a term, of a predetermined type, contained in text data in Japanese (an example of a first language) by a parameter. Then, translation processor 114 obtains a translation in English (an example of a second language) of the text data in Japanese containing the parameter, and converts the parameter contained in the translation into a translation of the term, thereby generating translation result data.

Particularly in fixed-phrase translation, translation processor 114 selects a translation after replacing a frequently changing term (airport name, flight number, time, and the like in the example of the present disclosure) by a parameter. Then, translation processor 114 finally replaces the parameter part by a term. By this operation, it is possible to improve the accuracy in similarity determination with respect to a fixed phrase and to thus improve the translation accuracy.

Further, weighting is performed depending on a type or a degree of importance of a parameter (for example, a length of a character string is adjusted). With this measure, it is possible to cause an important term to largely affect particularly in similarity determination, so that it is possible to improve the translation accuracy.

In addition, it is possible to narrow the search range of example sentences, depending on the determined scene. Therefore, it is possible to efficiently perform similarity determination and to thus improve the speed of translation.

Other Exemplary Embodiments

The first exemplary embodiment has been described above as an illustrative example of the technique disclosed in the present application. However, the technique in the present disclosure is not limited to the exemplary embodiment, and may be applicable to exemplary embodiments in which changes, replacements, additions, omissions, or the like are made as appropriate. Further, it is possible to form a new exemplary embodiment by combining the components and the functions described in the first exemplary embodiment.

Therefore, other exemplary embodiments will be illustrated below.

[1]

In the above exemplary embodiment, translation device 110 transmits to each display device 20 the translation result data in English as a second language; however, translation device 110 may transmit the translation result data in a language assigned to each display device 20.

Figure 13:
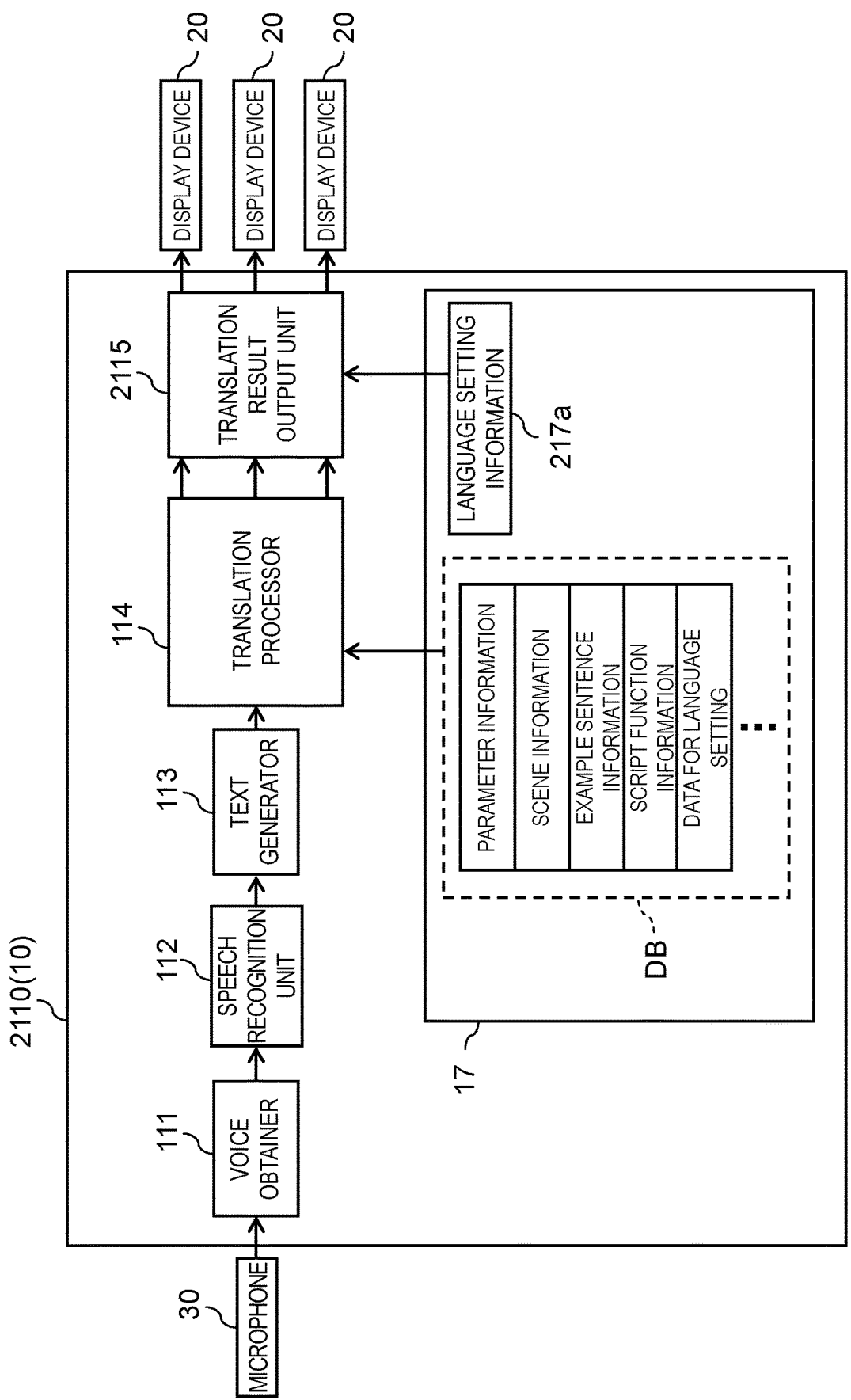
FIG. 13 is a configuration diagram of a translation device of another exemplary embodiment.

FIG. 13 is a function block diagram of translation device 2110 according to the present example. Translation device 2110 is different from translation device 110 in that translation device 2110 translates recognized text data in the first language into a plurality of second languages and transmits each piece of the translation result data in the plurality of second languages to each corresponding display device 20. In addition, translation device 2110 is different from translation device 110 in that translation device 2110 holds translation information in a plurality of second languages in example sentence sets and parameter information in database DB. Translation result output unit 2115 determines, with reference to language setting information 217a previously stored in storage device 17, the translation result data translated in which of the second languages should be transmitted to each of display devices 20. Translation result output unit 2115 transmits the translation result data based on the determination result. Language setting information 217a is set by a user of each display device 20 via an operation on input device 28 (see FIG. 1). Language setting information 217a is transmitted to translation device 2110 and stored in storage device 17.

However, language setting information 217a may be transmitted to translation device 2110 and stored, depending on seat reservation information or nationality of a user and other information.

The other configuration and functions are the same as in the first exemplary embodiment.

[2]

The translation result data transmitted to each display device 20 may be data in multiple languages. For example, if it is not known which language the user prefers, a plurality pieces of translation result data may be displayed depending on the language of the nationality of the aircraft, the language of the country of departure, the language of the country of destination, and other languages.

[3]

In the above exemplary embodiment, the translation result data is displayed on display 29 of display device 20, but the exemplary embodiment is not limited to this example. The translation result data may be converted into voice and be output from an earphone (not shown) of display device 20. Alternatively, the translation result data may be converted into voice on server device 10 and may be announced in the aircraft through speaker 40.

Further, the translation result data may be displayed on a large-screen display connected to server device 10 for a plurality of users to watch.

[4]

Translation device 110 is not limited to be used in an aircraft. Translation device 110 may be used in places where translation using fixed phrases is possible, for example, announcement in airports, other transportation facilities, restaurants, hospitals, accommodation facilities, and the like.

Translation device 110 may be provided on a computer terminal. In this case, a translation process may be performed on data having been input in a form of voice or text, and the translation result may be output through a speaker or a display. Here, when the data is input in a form of voice, speech recognition processing is performed before the translation process.

[5]

In the above exemplary embodiment, the threshold value for determining similarity is 70, but the threshold is not limited to this value. Threshold value may be larger than 70 or smaller than 70.

Further, the threshold value may be set depending on the scene to be determined. For example, the threshold value for the scene at the time of emergency may be higher than the threshold values of the other scenes so that the translation result data with higher accuracy can be obtained.

[6]

In the above exemplary embodiment, translation device 110 changes the search range of the example sentence information, depending on the scene to be determined; however, instead of this operation or in addition to this operation, a priority order of search may be changed depending on the scene to be determined. For example, it is supposed that the example sentence subsets corresponding to (9) "emergency communication" shown in FIG. 11 are assigned as the search object for any of the scenes because such example sentence subsets are very important. However, the example sentence subsets corresponding to (1) "boarding" has lower possibility than (4) "stably flying". In view of the above, it can be considered, for example, that the priority order of search on the example sentence subsets corresponding to (1) "boarding" is made low. In this case, if a very high score of similarity is obtained while search is being performed, the search may be stopped to perform a translation process by using such example sentence set. It is possible to change the order in which the example sentence information is referred to, depending on the scene in the above manner.

[7]

The script function may be used depending on the kind of the second language. For example, in a cultural region where the same unit is used, the unit of temperature shown in FIG. 9B does not have to be changed even if the language is different. In this case, the information containing the correspondence relationship between the kind of the second language and unit information is previously stored in storage device 17. Then, in step S411 of FIG. 4, translation processor 114 may perform replacement on the translation after it is determined, by determining the kind of the second language, whether to use the script function.

[8]

The order of performing the processes in the above exemplary embodiment (processes in FIG. 3, FIG. 4, and the like) is not limited to the description in the above exemplary embodiment, and the order can be changed without departing from the gist of the invention.

For example, with reference to FIG. 4, the determination of the current scene (step S405) may be performed before the determination of parameter (step S402) or may be performed simultaneously with the determination of parameter.

[9]

Figure 14A:
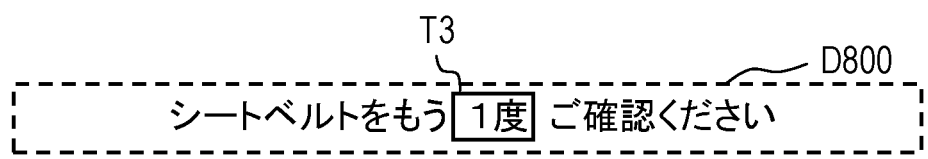
FIG. 14A is diagram showing an example of an example sentence.
Figure 14B:
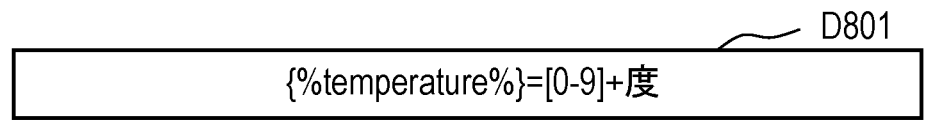
FIG. 14B is a diagram showing an example of a regular expression.
Figure 14C:
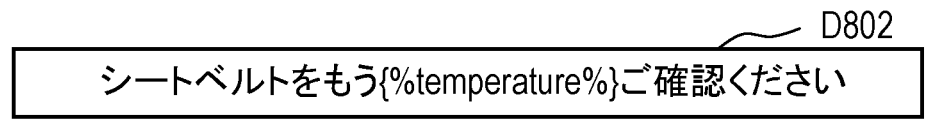
FIG. 14C is a diagram showing an example of data containing a parameter.

Since the example sentence subsets are obtained depending on the scene, the types of the parameters contained in the example sentences can also be listed by checking the example sentences. Therefore, it is possible to limit the types of the parameters (airports and the like) for which search is performed, by using a regular expression, on the voice recognition result (speech) sentence. With this measure, it is possible to reduce the problem that the part which should not be replaced by a parameter is replaced by a parameter. This operation will be described with reference to FIG. 14A to FIG. 14C.

For example, suppose the case where the example sentences for (2) taxing on runway or (3) taking-off include example sentence D800 and where the parameter information includes regular expression D801 as the regular expression for the term related to temperature. When example sentence D800 is spoken, the expression of term T3 happens to match a parameter related to temperature, and example sentence D800 can be replaced by data D802.

However, in reality, in (2) taxing on runway or (3) taking-off, there is no example sentence containing the term related to temperature. Therefore, the term related to temperature is prevented from being detected in (2) taxing on runway or (3) taking-off, when detection of term is performed in step S402. With this measure, translation with high accuracy can be achieved.

[10]

Figure 15A:
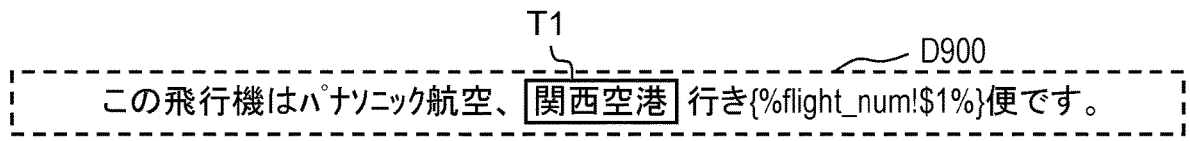
FIG. 15A is a diagram showing an example of data containing a parameter.
Figure 15B:
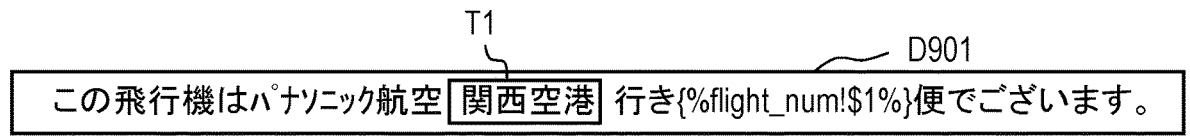
FIG. 15B is a diagram showing an example of an example sentence.

Specific parameter information may be previously replaced by information owned by an aircraft. This measure will be described with reference to FIG. 15A and FIG. 15B.

For example, if system 1 previously obtains the information that the aircraft is bound for Kansai Airport, the parameters, in the example sentence, about the destination are all previously replaced by term T1. Further, when the term is detected in step S402, term T1 is made not to be searched. When this replacement is performed, the text data after the replacement of parameter is performed on the speech sentence is data D900. In addition, the example sentence having the highest similarity is example sentence D901. With this measure, if an airport name such as "Haneda Airport", which is not the destination, is spoken, the score of similarity can be lower. Therefore, the translation accuracy is improved.

Note that system 1 holds information indicating which parameter in the example sentence is related to the destination, and system 1 refers to the information. For example, the information, such as that "{% airports_____$1%}" in example sentence D408 (see FIG. 5E) is related to the destination but "{% airports!$1%}" in FIG. 7B is not related to the destination, is managed in a table. Since this table is referred to, "{% airports!$1%}" in the example sentence shown in FIG. 7B is not replace by term T1.

[11]

In the above exemplary embodiment, voice data is input, but the present disclosure is not limited to this exemplary embodiment. For example, text data may be obtained through an input I/F from an input device such as a touch panel or a keyboard, or text data may be obtained through a communication I/F from an external device. Based on the text data, the translation process by translation processor 114 may be performed.

[12]

Translation device 110 according to the present disclosure does not have to be practiced only according to the above exemplary embodiment. The scope of the present disclosure includes: a translation method to be performed by translation device 110; a computer program to be executed by translation device 110; and a computer-readable recording medium in which the program is recorded. Examples of the computer-readable recording medium include a flexible disk, a hard disk, a compact disc read-only memory (CD-ROM), a magneto-optical disk (MO), a digital versatile disc (DVD), a DVD-ROM, a DVD-RAM, a Blu-ray (registered trademark) disc (BD), and a semiconductor memory.

The above computer program is not limited to a computer program recorded on the above recording medium and may be a computer program that is transferred via a network or the like represented by an electric communication line, a wireless or wired communication line, and the Internet.

[13]

In the above exemplary embodiment, it is not necessary to perform determination or replacement of a parameter. That is, with reference to FIG. 4, after obtaining the text data in step S401, translation processor 114 performs the determination of scene in step S405 and selects the example sentence subset corresponding to the scene in step S406.

In this case, by selecting the subset of the example sentence depending on the determined scene, the search range of the example sentence information can be narrowed. Therefore, the translation process can be more efficient, and the process of translation can thus be faster.

Based on this, an invention according to another aspect can be expressed as follows.

A translation device including:

an input unit that obtains input data in a first language; and a controller that recognizes the input data, generates text data in the first language based on the recognized input data, and generates text data in a second language that is a translation of the text data, wherein, by referring to a reference text data group including an example sentence in the first language and the translation, of the example sentence, in the second language, the controller obtains an example sentence whose similarity to the text data in the first language is more than or equal to a threshold value, and generates text data in the second language based on the translation, of the example sentence, in the second language, the controller determines a scene that changes depending on at least one of time and an environment, and the controller changes, depending on the scene, at least one of a range and an order in which the reference text data group is referred to.

INDUSTRIAL APPLICABILITY

The present disclosure can be used as a translation device.

REFERENCE MARKS IN THE DRAWINGS 1 system
10 server device
11 CPU
12 ROM
13 RAM
14 input I/F
15 output I/F
16 communication I/F
17 storage device
20 display device
21 CPU
22 ROM
23 RAM
26 communication I/F
27 memory
28 input device
29 display
30 microphone
40 speaker
110 translation device
111 voice obtainer
112 speech recognition unit
113 text generator
114 translation processor
115 translation result output unit
2110 translation device
2115 translation result output unit

The invention claimed is:

1. A translation device comprising:

an input unit configured to obtain first text data in a first language; and a controller configured to generate second text data in a second language that is a translation of the first text data, wherein:

the controller is configured to:

replace a first term, of a predetermined type, contained in the first text data with a parameter that contains designation information, replace the designation information of the parameter, which has replaced the first term, with a character string having a length in accordance with a degree of importance of the first term, thereby generating first replacement data, obtain second replacement data, in the second language, corresponding to the first replacement data, and generate the second text data by replacing the parameter contained in the second replacement data by a second term in the second language that is a translation of the first term.

2. The translation device according to claim 1, wherein:

the parameter includes parameter position information that indicates a position of the first term in the first text data, and the controller is configured to select the second term according to the parameter position information.

3. The translation device according to claim 1, wherein:

the controller is configured to select an example sentence whose similarity to the first replacement data is higher than or equal to a threshold value, and the controller is configured to obtain as the second replacement data a translation of the example sentence.

4. The translation device according to claim 3, wherein the controller is configured to obtain the translation of the example sentence by referring to a reference text data group including the example sentence and the translation of the example sentence.

5. The translation device according to claim 4, wherein the controller configured to determine a scene that changes depending on at least one of time and a surrounding environment, and change, depending on the determined scene, at least one of a range and an order in which the reference text data group is referred to.

6. The translation device according to claim 5, wherein the controller is configured to change the threshold value, depending on the determined scene.

7. The translation device according to claim 1, wherein:

the second language includes a plurality of second languages, and the controller is configured to generate the second text data with respect to each of the plurality of second languages.

8. The translation device according to claim 1, comprising a connection unit, wherein the controller is configured to transmit, via the connection unit, the second text data to an information terminal that is set to the second language.

9. The translation device according to claim 1, wherein the controller is configured to:

determine whether the first text data contains the first term of the predetermined type, and when the first text data is determined not to contain the first term, obtain the translation of the first text data.

10. The translation device according to claim 1, wherein the input unit is configured to obtain the first text data by recognizing voice data in the first language.

11. The translation device according to claim 1, wherein the predetermined type comprises a category of important information and is associated with recognized text contained in the first text data.

12. The translation device according to claim 1, wherein the degree of importance is a degree of weighting previously set depending on type of the parameter and the first term.

13. A translation method comprising:
- obtaining first text data in a first language;
- replacing a first term, of a predetermined type, contained in the first text data with a parameter that contains designation information;
- replacing the designation information of the parameter that has replaced the first term, with a character string having a length in accordance with a degree of importance of the first term, thereby generating first replacement data;
- obtaining second replacement data, in a second language, corresponding to the first replacement data, from a memory; and
- generating second text data in the second language by replacing the parameter contained in the second replacement data by a second term in the second language that is a translation of the first term.

* * * * *